(12) United States Patent
Schultz

(10) Patent No.: US 6,731,491 B2
(45) Date of Patent: May 4, 2004

(54) BULK DEGAUSSER WITH FIXED ARRAYS OF MAGNET POLES

(75) Inventor: Robert A. Schultz, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 240 days.

(21) Appl. No.: 09/882,015

(22) Filed: Jun. 15, 2001

(65) Prior Publication Data

US 2003/0043528 A1 Mar. 6, 2003

(51) Int. Cl.⁷ ............................................. H01H 47/00
(52) U.S. Cl. ........................................ 361/149; 361/143
(58) Field of Search ................................ 361/143, 149, 361/151; 335/219, 284

(56) References Cited

U.S. PATENT DOCUMENTS

| | | |
|---|---|---|
| 2,481,392 A | 9/1949 | Camras |
| 2,766,328 A | 10/1956 | Handschin et al. |
| 2,962,560 A | 11/1960 | Folse |
| 3,023,280 A | 2/1962 | Tronslin et al. |
| 3,078,396 A | 2/1963 | Engelsted |
| 3,143,689 A | 8/1964 | Hall |
| 3,329,872 A | 7/1967 | Amos |
| 3,588,623 A | 6/1971 | Camras |
| 3,872,347 A | 3/1975 | Matsushima et al. |
| 3,879,663 A | 4/1975 | Stark, Jr. |
| 3,879,754 A | 4/1975 | Ballinger |
| 3,895,270 A | 7/1975 | Maddox |
| 3,938,011 A | 2/1976 | Littwin |
| 4,136,373 A | 1/1979 | Amos |
| 4,146,956 A | 4/1979 | Fujiwara |
| 4,157,581 A | 6/1979 | Keiichi et al. |
| 4,180,835 A | 12/1979 | Okumura et al. |
| 4,187,521 A | 2/1980 | Rotter et al. |
| 4,346,426 A | 8/1982 | Baumann et al. |
| 4,378,581 A | 3/1983 | Kuno et al. |
| 4,423,460 A | 12/1983 | Jackson et al. |
| 4,462,055 A | 7/1984 | Jackson et al. |
| 4,462,059 A | 7/1984 | Yamagami et al. |
| 4,467,389 A | 8/1984 | Knipp |
| 4,471,403 A | 9/1984 | Dress, Jr. et al. |
| 4,551,782 A | 11/1985 | Seely et al. |
| 4,617,603 A | 10/1986 | Johnson et al. |
| 4,639,821 A | 1/1987 | Littwin et al. |
| 4,730,230 A | 3/1988 | Helfrick |
| 4,751,608 A | 6/1988 | Schultz |
| 4,829,397 A | 5/1989 | Vernikov et al. |
| 4,897,759 A | 1/1990 | Becker |
| 5,132,860 A | 7/1992 | Von Stein |
| 5,198,959 A | 3/1993 | Scholtysik et al. |
| 5,204,801 A | 4/1993 | Becker et al. |
| 5,270,899 A | 12/1993 | Saito |
| 5,416,664 A | 5/1995 | Becker et al. |
| 5,666,413 A | 9/1997 | Kempf |
| 5,721,665 A | 2/1998 | Schultz |
| 5,787,619 A * | 8/1998 | Urushibata .................. 40/449 |
| 5,969,933 A | 10/1999 | Schultz et al. |

* cited by examiner

Primary Examiner—Stephen W. Jackson
Assistant Examiner—Boris Benenson
(74) Attorney, Agent, or Firm—Fitch, Even, Tabin & Flannery

(57) ABSTRACT

A bulk degaussing apparatus and method for erasing magnetic media of various sizes. A plurality of fixed magnetic poles are predisposed around a gap for projecting magnetic flux across the gap such that the spacing of the poles is provided at roughly equal intervals or sets of intervals across the gap to form sets of magnetic fields at the staggered intervals. A media passage is provided such that across the width of the passage at every point, media passing therethrough is linearly exposed to the magnetic fields provided through the gap. An adapter constrains location of the media passing through the gap by way of the media passage such that the plurality of magnetic poles effectively degausses regions formed between the poles. Placement of the magnetic poles is provided with partial overlap of facing poles on opposite sides of the pathway of the media passage. Two or more multi-pole degaussing regions provided with differing orientation avoid regional weaknesses or singularities in the magnetic field.

14 Claims, 5 Drawing Sheets

BULK DEGAUSSER WITH FIXED ARRAYS OF MAGNET POLES

BACKGROUND OF THE INVENTION

1. Field of the Invention

This invention generally relates to information erasure by magnetic degaussing fields of effective strength and multi-dimensional direction applied to magnetic tapes and disks traversing a pathway. In particular, this invention specifically relates to apparatus with multiple and generally duplicate magnetic field generating elements of simple geometry, capable of generating and concentrating multiple interacting flux density fields, predisposed such that media passage causes a range of erase conditions over all points within that media, thereby addressing geometric and material variations internal to the media.

2. Description of the Prior Art

More common in the prior art are magnet means placing two or more poles proximal to one side or both sides of the media. Electromagnet cores in the form of extruded "U" or "E" profiles promote efficient application of windings, such that poles form at the ends of the core appendages for projection of magnetic flux into the media. Problems arise with magnet poles applied only to one side of thick media, as magnetic strength or flux density tends toward inverse proportion with the square of distance from a source such as a pole.

Many forms of prior art bulk degaussers predispose magnetic poles on both sides of magnetic media. Most prior art operates with sets of like poles facing each other across the gap provided for bulk degaussing magnetic media in order to obtain magnetic flux parallel to a plane of mirror image symmetry. U.S. Pat. No. 4,730,230 discloses switching means to change electromagnet operation from like poles to unlike poles facing, yielding flux directed parallel to and perpendicular to the symmetry plane at different times. U.S. Pat. No. 3,023,280 specifies connections that reverse current in one of four coils predisposed about legs of otherwise symmetrically disposed "E" cores, leading to a known commercial practice exhibiting small magnet size in relation to capability. U.S. Pat. No. 5,416,664 discloses offsetting two electromagnetic "U" cores from alignment of unlike poles closest to each other. All of these examples demonstrate the advantages of less symmetric field generating apparatus as compared to more easily constructed and commonly applied apparatus having multiple mirror-image symmetry.

In the interest of protecting information recorded on magnetic media, means placing the media in close proximity to even a single strong magnet can impede recovery of information by ordinary means. Depending on the direction of magnetization of the magnetic material, U.S. Pat. No. 5,666,413 may disclose a single pole, permanent magnet degausser. Depending of the material used for the frame of that invention, it may provide a path of low magnetic reluctance for purposes of returning flux from the working pole to an unlike pole of the magnet distal to the pathway for magnetic disks defined by the frame.

Common forms for information storage on magnetic media include disks and tape wound on reels. In themselves, circular tracks on disks and anisotropic magnetic coatings on nearly circular layers of tape wound on reels exhibit a range of directions. The prior art cited thus far either cannot apply more than fringing flux everywhere in the circular direction of tracks, or else requires more than simple linear motion of the media with respect to the magnetic field. That motion might be accomplished by a human with some skill and diligence, as in the case of a hand-held degausser, or with an automated sequence of motions generally involving rotation either of the media or of magnets generating the degaussing fields.

Problems arise in attempting to configure a complex-motion degausser to a wide variety of media. For example, media can have multiple axes of circularity, as in the case of a partially rewound, 2-reel tape cassette. Some disk drive housings contain the axis of circular disks but do not reveal its location. Also, application of magnetic flux only in the direction of tracks does not ensure erasure of locally magnetized regions having off-track components, as result both from perpendicular components of magnet record head fields, and from fringes along edges of record heads. All but the simplest prior art cited thus far attempts exposure to a variety of magnetic flux directions.

Phased excitation of large, orthogonal coils specified in U.S. Pat. No. 4,617,603 electrically rotates the direction of a magnetic field equal to the media size. Since the electrically rotating field exists everywhere in the media at once, no media motion is required. But phased, media-sized fields imply control over a great quantity of energy, as described in U.S. Pat. No. 5,969,933. Adding a third orthogonal winding to the cavity degausser enables field generation in any direction, but again at added cost and complexity.

U.S. Pat. No. 4,423,460 also discloses means to degauss by electrical rotation of media-sized fields, in this case by phased excitation of multi-pole cores somewhat larger than the target media.

U.S. Pat. No. 4,157,581 discloses rotating, multiple-pole permanent magnets predisposed with mirror-image symmetry so that like poles face each other across a gap admitting a tape cassette intended to be translated through the field that they generate. Given enough rotation per unit translation, all points of tape on either reel will see field in the tangential direction of tracks, but symmetry imposes zero strength in the transverse direction across the tape along a center plane.

U.S. Pat. No. 5,132,860 further discloses rotation of permanent magnets disposed about a degaussing gap at different speeds, leading to a conditions alternating from like poles facing and flux directed parallel to the symmetry plane, to unlike poles facing and flux directed perpendicular to that plane.

Fixed or rotating magnets arrayed for degaussing with simple, linear media motion can become bulky. The Electromatic Products Co. model HE15VB exemplify the extremes of dimensions, weight and input power applied in the prior art of bulk degaussing large sizes of high coercivity media on a linear conveyor.

A particular challenge in the adaptation of a general-purpose bulk degausser to the erasure of entire hard disk drives arises because certain massive ferromagnetic components of such disk drives experience strong force interactions with the degaussing magnets. Means to turn the magnets off to relieve such forces as practiced in U.S. Pat. No. 5,721,665 are not possible in the art of degaussing with permanent magnets.

SUMMARY OF THE INVENTION

The present invention treats all points within media to an extended range of magnetic directions, regardless of internal geometry, as a safeguard against fringing effects intrinsic to magnetic patterns encoding information on coatings of the magnetic media, by means not practiced in the art but particularly adaptable to the use of permanent magnets as field generators. In doing so, it can avoid the need for any electrical power, including even battery-powered process monitoring circuitry.

It is an object of the present invention to provide means and apparatus for bulk degaussing magnetic media which solves various problems in the prior art.

It is an object of this invention to provide means and apparatus to vary magnetic field direction while maintaining field strength in such a way as to expose all points within media to three-dimensional directions at effective strengths.

It is yet another object of this invention to produce such multi-directional strength with essentially zero energy input, excepting energy that may be provided by human operators to introduce media into the degausser, to extract media from it as needed, and for manual adjustments to accommodate different media thickness.

Briefly, the present invention relates to bulk degaussing apparatus, and more particularly to means which changes field direction using fixed arrays of magnet poles constructed with simple geometries and predisposed about a path provided for bulk degaussing media.

BRIEF DESCRIPTION OF THE DRAWINGS

These and other objects of the present invention will be readily understood with reference to the following specification and attached drawing, wherein.

DETAILED DESCRIPTION OF PREFERRED EMBODIMENTS

Figures 1, 2, 3:
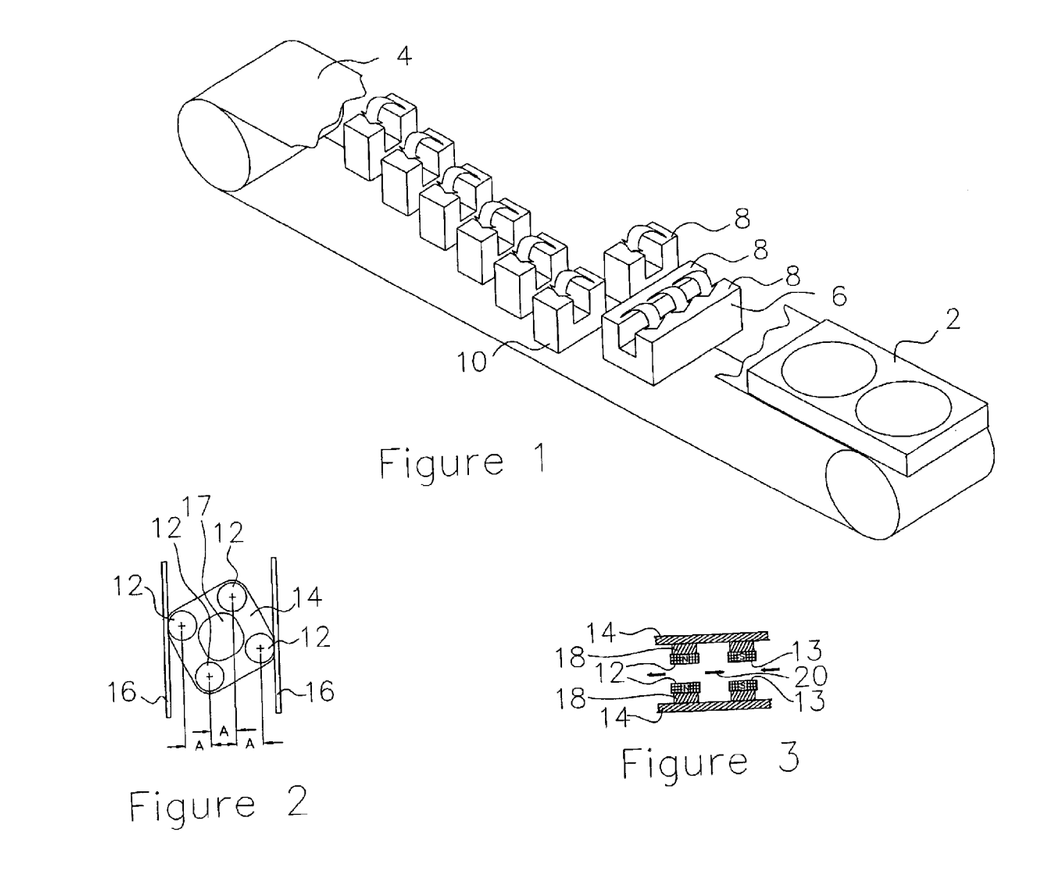
FIG. 1 represents poles formed by an array of magnets of an extruded "U" shape.
FIG. 2 represents an array of four circular poles fixed at angles near 27 degrees to each other with respect to a pathway provided for media passage, yielding equal spacing between each other and equal spacing across the width of that pathway.
FIG. 3 is a partial cylindrical cross section through two poles of FIG. 2 mirror imaged across a degaussing gap from two additional poles illustrating the resulting flux direction parallel to the symmetry plane.

This embodiment can take on many forms generally improving on the configuration shown in FIG. 1, where each set of magnet poles connected by materials of high magnetivity and low magnetic reluctivity are arranged to project magnetic flux into a degaussing gap in a substantially single direction, at least in some region generally constituting the worst-case for the configuration. An array of magnets located under a linear conveyance 4 provided for motion of cassette 2 can include one magnet 6 in the form of a relatively long "U"-shape extrusion perpendicular to that motion with poles 8 generating flux represented by curving arrows generally in the direction of that conveyance and across the entire width of that conveyance.

In order to produce flux perpendicular to the motion of media conveyance, additional members 10 of the magnet array generally exhibiting the same "U"-shape may be provided. As shown, the additional magnets must have core depth sufficient to counter fringing, must be staggered across the width of conveyance at relatively small pitch to avoid "dead zones," and must be spaced sufficiently to avoid undesired interactions. The unavoidable flux fringing of such configurations is generally regarded as a nuisance that may contribute to localized performance boosts. Exploitation of fringing for global erasure enhancement proves difficult for a magnet configured primarily to generate strong magnetic flux in a single direction.

Realize that in order to treat relatively thick media 2 as shown, the array seen in FIG. 1 would be predisposed about a degaussing gap with its mirror-image. Such requirements lead to bulky, heavy apparatus. U-cores and their mirror images can be predisposed at other angles with respect to a conveyance, such as a two identical pairs of U-cores, each at 45 degrees with respect to the media path and at 90 degrees with respect to each other. Placement of U-cores at 45 degree angles to a media path requires length for each about 1.4 times that shown for magnet 6 in FIG. 1 and yields an overall media path length of degree similar to that shown. Merely providing separate fields oriented at 90 degrees to each other causes magnetic strength in the direction of circular tracks on tapes or disks to fall toward 70% of maximum at some points.

With regard to the long poles that form on magnets of generally extruded shape, as illustrated in FIG. 1, it has been observed in the described embodiment that benefit is derived primarily from poles having aspect ratio approaching unity rather than pole length generally, as for example square or circular poles. In addition, preferred embodiments generally utilize magnet structures with more than two poles, generally but not necessarily even in number, generally sharing some common paths of low magnetic reluctance between them away from the degaussing gap, and generally spaced at similar distance from each other and at equal intervals across the width of a pathway that restricts passage of media through a predetermined degaussing gap.

Poles of aspect ratio approaching unity might be applied to the prior art of rotating magnets. While an array of rotating poles may be seen as an improvement upon effective arrays achievable with fixed U-cores, the rotating mechanism itself is complex, especially for a range of applications where it is desired to adjust the spacing between sets of poles predisposed about the degaussing gap for purposes of adaptation to different media thickness. Furthermore, exposure of every point in media to localized fields produced by rotating magnets implies some significant exposure time or rotation speed. Rotation of magnets at different speeds to alter the geometric relationships between poles, thereby improving the range of magnetic field directions, compounds the time or speed requirement.

In cases where zero input power is not required, the present invention may be realized by exciting various members with electrical currents in coils wound around various members. Excitation could be by DC currents or by AC currents, in which case phased excitation of poles extending beyond the extent of the media disclosed in the prior art is not required to gain the benefits of the invention. For purposes of simplicity, various permanent magnet embodiments of the invention best suited to emergency application are described in detail.

FIG. 2 illustrates in top view the geometry of the invention adapted to cylindrical permanent magnets of 3 inch diameter, magnetized parallel to their axis so that only their circular poles 12 can be seen in the view. Adjacent poles are illustrated as being spaced apart at intervals equal to their diameters. The large pole diameter represents a standard industry size and the maximum available from some producers of sintered rare-earth magnets. Attaching the magnets ends away from the gap on a base of iron or steel 14 provides a high permeable path returning magnetic flux at high density between them in regions away from the poles, which face a degaussing region beyond them out of the plane of the figure. Where magnets mounted adjacent to each other on base 14 are oriented so that unlike poles face the degaussing region, flux need not flow diagonally through the base between magnet pairs with like poles facing the gap, so hole 17 may be introduced into base 14 to save weight.

Media guides 16 spaced just over 11 inches apart allow passage of circular reels 10.5 inches in diameter through a predetermined degaussing volume proximal to the poles. As can be appreciated from the fact that a right triangle with one vertex of angle 27 degrees exhibits a base to height ratio of nearly 1:2, rotation of base 14 and poles 12 supported by it to the 27 degree angle illustrated with the respect to media guides 16 results in equal spacing "A" of magnet poles 12 across much of the width defined by guides 16.

The partial cylindrical cross section of FIG. 3 illustrates a pair of mirror-imaged North poles 12 predisposed across a degaussing region and restricting that region to a gap suited to limit media thickness and to concentrate magnetic flux, and adjacent pair of mirror imaged South poles 13 predisposed across that gap. FIG. 3 further discloses supporting iron posts 18 serving as low reluctance flux paths between the permanent magnet poles and bases 14. The supporting iron posts, able to contain flux at higher saturation density than permanent magnets, may be of reduced diameter in order to distance the magnets from the base and reduce leakage flux near their mating surfaces, much like the concave inner surface of a classical horseshoe magnet shape.

Central arrow 20 represents the predominant flux direction through an air gap following the North to South convention. Peripheral arrows pointed opposite from central arrow 20 merely represent flux from poles shown in the partial cylindrical cross section to remaining adjacent poles not shown in the partial section. Approaching the symmetry plane, flux can only flow parallel to that plane as represented by the arrows. Furthermore, since flux lines never cross and follow strict divergence rules, regions between the arrows, centered between the like opposing poles, may be thought of as "dead zones" of ineffective magnetic strength.

Figure 4:
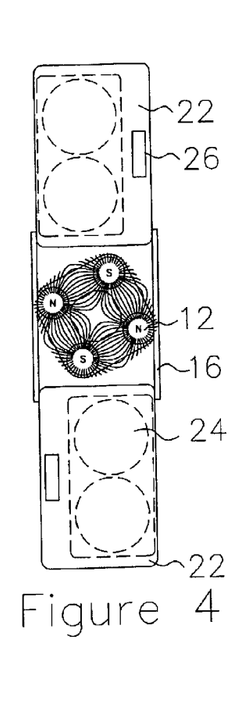
FIG. 4 is a view through the symmetry plane of FIG. 3 showing principle flux directions in that plane in association with pole locations, a media pathway, and form factor properties like maximum width of media to which a particular embodiment might be suited.

FIG. 4 represents a side view through the symmetry plane of the configuration illustrated in FIGS. 2 and 3 with a vertical or "drop-through" orientation. Except for the gravity assist given to media passage in this orientation, operation would be equivalent if for example FIG. 4 represented a top view through the symmetry plane of a push-through or conveyorized embodiment. For four pairs of like poles facing each other just over 2 inches apart about the symmetry plane, 3 inches in diameter, separated by 3 inches and rotated 27 degrees with respect to guides 16 defining a media pathway just wider than 11 inches, an embodiment of the invention will admit passage of media form factor known to the art as large D1 cassettes contained in protective cases 22 commonly measuring 17 inches long by 11 inches wide by 2 inches thick.

The geometry of large D1 cases confines reels 24 within the cassettes and tape thereon to be no closer than 0.75 inches from one edge of the case. That closest reel edge may lie along either guide 16, depending on the orientation of cassette case handle 26. Therefore, in the application of this embodiment of the invention to large D1 cassette cases of said common dimensions, the effective degaussing field need not exceed 9.5 inches in width and need not depend on handle orientation. Conversely, an embodiment restricting handle orientation might offset guides 16 laterally away from the handle side, allowing spacing of 3-inch poles 12 somewhat closer to obtain somewhat greater strength for a given magnet size across the 7 inch diameter of reels 24 in a D1 cassette contained by case 22.

The symmetry plane between facing like poles generally constitutes the region of both weakest magnetic flux, being farthest removed from the poles, and zero component of flux direction perpendicular to that symmetry plane. Generally curved lines extending between or from poles 12 in FIG. 4 represent the direction of flux along that plane at density of effective degaussing strength. No flux flows between diagonally disposed like poles. Flux concentrates to effective strength between adjacent poles because the shortness of the air gap poses the path of least magnetic reluctance. Flux diverges over relatively wide areas despite the increasing distances due to mutual repulsion of flux lines from like poles facing each other across the gap. Flux lines that do not span the distance between adjacent poles represent divergence over distances to density of ineffective strength. Despite such divergence, such "fringing" flux can exhibit significant strength over regions close to the poles from which they emanate.

Any line drawn vertically in the direction of media passage through FIG. 4 will intersect two or more regions of effective flux density. Variation of direction as any point in media passes linearly through any such set of multiple regions can be seen to encounter a range at least exceeding 90 degrees and generally comprising rotation approaching 180 degrees at effective strength. Effective fields may rotate minimally near guides 16 where the geometry of reels 24 contained with cases 22 prohibit the occurrence of tape. Thus all points near the symmetry plane of media that drops through the gap must experience a wide range of magnetic field directions in that plane at effective degaussing strength. Since magnetic domain switching can occur in a microsecond, performance does not suffer at drop-through speed, allowing high throughput in comparison to degaussers requiring more complex motion.

The invention is also adaptable to a variety of media form factors other than large D1 cases. It is known to those practiced in the art of bulk degaussing that both the high information density of high coercivity disk drive media and the narrow statistical distribution of magnetic properties within such media render erasure of such disk drives effective at field strengths somewhat lower than that required for thorough erasure of the cobalt-iron-oxide formulation of D1 tape. For example, means such as a manually activated crank linked to a system of chains, sprockets and screws acting between supporting members of bases 14 can vary the separation of facing poles from the 2 inch gap required to admit large D1 cases to a 3.3 inch gap that will admit hard disk drives of the "full height" form factor.

Upon adjustment to a larger gap between facing like poles for the purpose of full height disk drive passage, flux density will drop from levels suggested by flux line spacing shown in FIG. 4. In particular, strength of fringing fields near guides 16 may drop below effective levels. A more particular problem encountered with hard disk drives in general and certain brands or models in particular are their containment of large, ferromagnetic components including head motors, spindle motors and fly wheels. The presence of such components generally do not shield media from degaussing fields but rather serve to attract flux toward media by reducing reluctance between poles and media. However, especially in the case of permanent magnet degaussing, such components can experience attractive magnetic forces that render their extraction from the degausser difficult.

Figure 5:
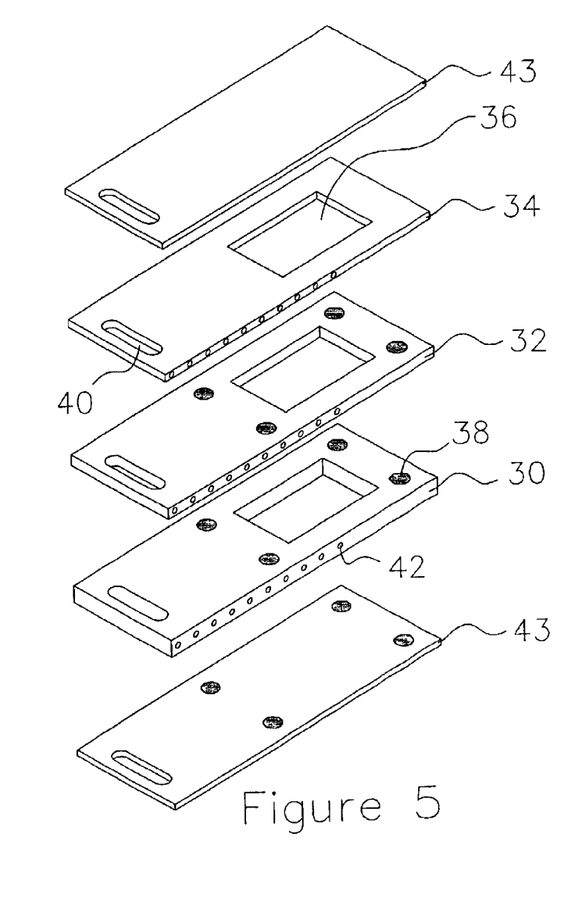
FIG. 5 illustrates members of an adapter suiting the apparatus represented in FIG. 4 to media having smaller form factors or particularly challenging characteristics such as massive ferromagnetic components.

FIG. 5 illustrates exploded elements of adapter means to facilitate degaussing of various media form factors. Individual adapter elements may vary in thickness and are preferably constructed from nonmagnetic, low-friction material. For example, element 30 may be 1.6 inches thick, corresponding to the thickness of a half height hard disk drive. Element 32 may be 1.0 inch thick, corresponding both to the thickness of a third height hard disk drive, and to the thickness of certain cartridges containing half inch tape and possessing a large steel plate. If element 34 is then 0.7 inches thick, the combined thickness of all three elements, attached by means that does not substantially alter their individual thickness, equals full height hard disk drive thickness.

The width of adapter elements 30, 32 and 34 may be considerably less than the 11 inch restriction imposed by media guides 16. Cavities 36 extending through adapter elements must be somewhat larger than any media to be contained by their combination but may be made individually larger to suit certain thinner media. Then, means to secure the elements to each other with minimal attention to their alignment by hand can be as simple as Velcro® pads 38 bonded to their surfaces.

The thickness of the adapter elements individually or in combination may serve as a gauge for adjustment of the spacing between magnet arrays. For example sizing the cavity of one inch thick element 32 to 6 inches by 10 inches admits both half height disk drives and large BetaCam SP® cassettes. Gauging the gap to that 1 inch thickness then increases both field directionality and strength to degrees suited to the higher coercivity of tape in that cassette.

Handles 40 provided in each adapter element facilitate their insertion into the degaussing gap between the magnet arrays, consequently carrying any media contained by cavities 36 into that gap. Extreme attractive forces between media components and magnets can be countered by a variety of additional means. Fulcrum means can be provided on the housing for the magnet arrays to cooperate with arrays of holes 42 provided on one or more surfaces of the adapter elements so that accessory levers can be used to insert the adapter and attractive media contained by it into the degaussing gap, and then to pry the adapter and media back out of the gap. Cover elements 43 may serve to reduce magnetic attraction by enforcing some minimum distance between degaussing poles and ferromagnetic components of media.

The mirror-imaged embodiments described thus far cannot generate flux through the symmetry plane and so cannot expose all points in media to flux directed along all three spatial dimensions. Addition of the third spatial direction to the invention can be achieved by an additional magnet assembly not shown in FIG. 2, FIG. 3, or FIG. 4. The circular pole arrays and media guides represented in those figures can be seen in the isometric view of FIG. 6 in association with a second magnet assembly having one pole 44 spanning the width of the media pathway on one side of the degaussing gap and second unlike pole 46 aligned opposite pole 44 across the gap.

Figure 6:
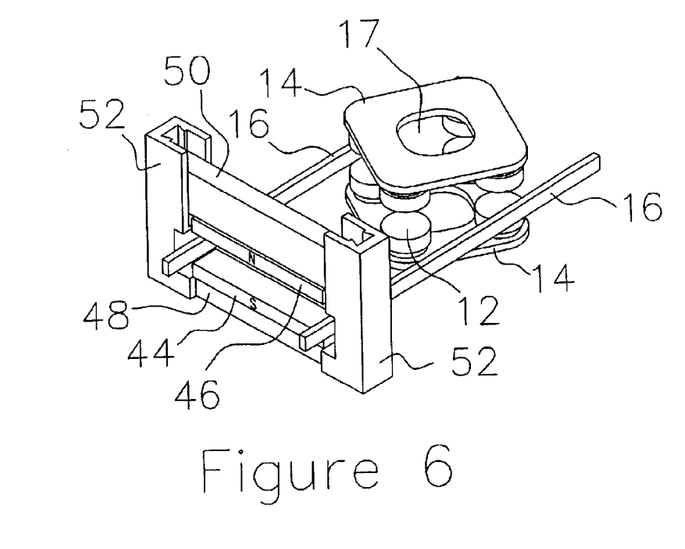
FIG. 6 illustrates an embodiment of the invention in association with supplementary poles of configuration practiced in the art to provide additional magnetic direction beyond that produced by the configuration illustrated in FIG. 2, FIG. 3, and FIG. 4.

Iron or steel lower horizontal member 48, upper horizontal member 50, and vertical members 52 support permanent magnets forming poles 44 and 46, thereby providing low reluctance pathways to return flux projected into the degaussing gap between the poles. Those supporting members are preferably shaped and relieved to minimize leakage flux. For adjustability to different media thickness, upper pole 46 secured to upper horizontal member 50 may connect to vertical members 52 through sliding joints of sufficient contact area to maintain low magnetic reluctance, such as with the dovetail joints shown. Then both upper pole 46 secured to upper horizontal member 50 and the upper array of four circular poles may be linked to a common media thickness adjustment mechanism.

Figure 7:
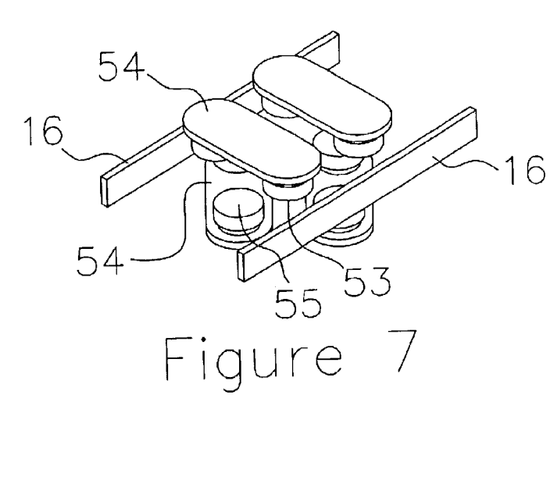
FIG. 7 represents an alternative embodiment of the invention able to generate a wide range of magnetic directions without the supplementary pole configuration shown in FIG. 6.

FIG. 7 illustrates alternative means to generate flux directed across a center plane everywhere across the media pathway in addition to directions along that plane that vary in direction at effective strength along the pathways of every point in the media. In this embodiment, one array of four poles 53 such as those formed by magnet assemblies above media guides 16 align with the pathway. A second set of poles 55 formed by magnet assemblies below media guides 16 are rotated 45 degrees with respect to the pathway and 22.5 degrees with respect to the poles above the guides. In this case, each pole resides in relatively close proximity with an unlike pole predisposed at an angle to it across the gap, and each pole also resides in similar geometric relationship to a like pole. Because flux flows most easily across the gap between unlike poles of closest proximity, each iron or steel base 54 need only connect one pair of unlike poles on each side of the gap to provide desired flux return paths.

Figure 8:
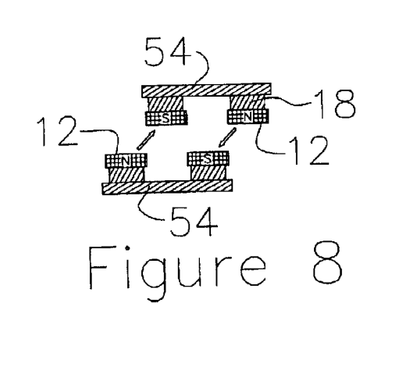
FIG. 8 is a partial cylindrical cross section through two pairs of poles located across the degaussing gap of FIG. 7, each pair being linked by one of the low reluctance magnetic bases seen in that figure, illustrating the primary flux direction crossing the center plane of the gap.

FIG. 8 represents a partial cylindrical cross section through two sets of pole pairs linked by bases 54 for flux return. Arrows represent the general direction of magnetic flux crossing the center plane, which is of course not a symmetry plane in this case. Because the upper magnet structure is not rotated and the lower structure is rotated 45 degrees with respect to the media pathway, that is 22.5 degrees with respect to each other, this arrangement does not possess the 27 degree rotation and resulting equal magnet spacing across the width of the media pathway yielded by the mirror image symmetry of like poles facing each other across the gap.

The arrangement illustrated in FIG. 7 does form four fields at different points across the width of the media passage, differing only in their rotation, reflection and separation with respect to each other, and in their location with respect to the media pathway. One of the fields represented by one arrow in FIG. 8, a partial cylindrical cross section of the arrangement seen in FIG. 7, forms near the edge of the passage width at an angle of predominately 22.5 degrees with respect to the direction of the pathway. The other field represented by the other arrow in FIG. 8 spans from the central region of the passage at an angle of predominately 67.5 degrees toward a region aligned along the pathway with the inward extent of the first field. The two other fields not represented in the partial section of FIG. 8 span similar regions across the width of the passage opposite the first two fields. As in the symmetric, like-poles facing embodiment, each of the fields exhibits curvature across some width at effective strength, so that any point in media traveling along the pathway will experience a range of directions parallel to planes defined by the poles on each side of the path-way, as well as field components in the third spatial dimension between poles on opposite sides of the passage.

Figure 9:
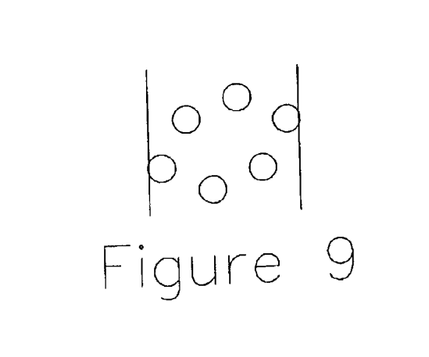
FIG. 9 illustrates adaptation of the invention to a number of poles on each side of the degaussing gap greater than four.

The invention is also not restricted to square arrangements of four poles. The arrangement of circular poles seen in FIG. 9, at vertices of a hexagon which is equilateral but not equiangular, follows the given guidelines of equal spacing between adjacent poles, and their location at equal intervals across the width of the media passage. Poles need not be of even number or of equal size. An odd pole number configuration of the invention might use different permanent magnet sizes to maintain equal areas of North and South poles, and equal volumes of permanent magnet materials to generate each type of pole. Nor must poles be circular in form. For poles of any shape and roughly unity aspect ratio, divergence and saturation tend to yield similar field shape and strength at maximum distance from the poles, typically along a center plane and generally constituting worst-case. That is not to say that some particular shape might improve the invention by remedying an otherwise weak region, as for example increasing convexity to boost fringing effects near the edges of a media pathway.

The invention is not restricted to highly symmetric configurations, such as like poles directly facing each other as seen in FIGS. 2, 3, 4, and 6, or unlike poles offset equidistant from like poles as seen in FIGS. 7 and 8. As with practical bulk degaussers in general, such configurations do not yield perfectly uniform exposure to magnetic strength and direction. In particular, like-poles facing configurations lead to zero strength perpendicular to a horizontal symmetry plane, and alternating poles leads to weakness in regions between poles toward one of the pole planes. Likewise, purely random placement leads to uneven field distribution.

Improved configurations of the invention may distribute poles at fairly equal intervals across the media pathway on both sides of that pathway by following placement rules that do not force unduly symmetric fields. Four placement symmetries arise from the combinations of two variables applied with an origin at the geometric center of a degaussing region within 8 poles; two North poles and two South poles on each side of a degaussing pathway. First, pole locations may be reflected either through the origin, or through the axis perpendicular to the media "horizontal". Defining that axis as the Z-axis, that rule either reverses the sign of all three pole-coordinates, or it reverses the signs of X and Y coordinates only, leaving reflected poles on the same side. Second, the polarity of reflected poles may be alike, or unlike.

Not all placements with promising pole relations prove beneficial. For example, with reversed polarity reflections, poles may be placed in a diamond pattern, with unlike poles alternating along diagonals of the pattern, with poles on the same side of the media pathway along one set of diagonals, and with poles alternating across sides of the pathway along the other set of diagonals. Such configurations cause unlike-pole interactions between poles centrally located and four neighbors, diluting the fixed flux available from the pole to a low-strength flux density.

Figure 10:
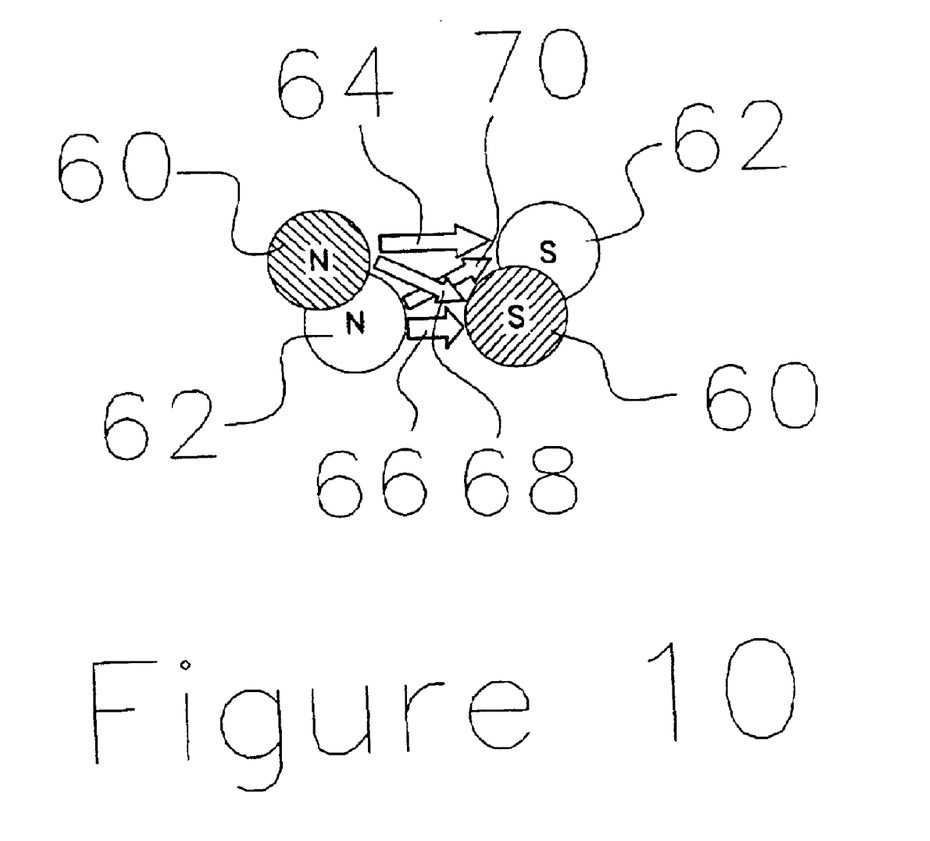
FIG. 10 illustrates magnetic field interactions that arise from two pairs of partially-overlapping like-poles facing each other across a degaussing gap.

Trial-and-error placement of four poles, reflection of them by a symmetry rule, calculation of the magnetic fields by finite elements analysis, and appraisal for uniform and high field strength and rotation over a sampling of linear pathways leads to a variety of improved configurations generally exhibiting a relationship between four of the poles similar to that shown in FIG. 10. Pairs of like poles partially overlap. Hatched circles 60 represent cross sections through magnets near the plane of poles on the near side of a degaussing pathway. Crescents 62 represent poles on the far side of the pathway partially hidden by the near poles. Arrows indicate the primary directions of high flux density between unlike poles. Horizontal arrow 64 represents North to South pole flux directed across the pathway from the near North pole to the far South pole. Likewise, horizontal arrow 66 represents flux directed across the pathway from the far North pole to the near South pole. Diagonal arrow 68 represents flux directed into the pathway from the near North pole to the near South pole, and diagonal arrow 70 represents flux directed into the pathway from the far North pole to the far South pole. Taken as a whole, the arrows represent a strong concentration of flux, or high degaussing strength, with a variety of directions enhanced by the repulsive interactions of the partially overlapping like poles. Calculation of the fields reveals Z-directed strength near the non-overlapping portion of each pole extending through the center plane, and strong horizontal strength mainly between unlike poles.

Figure 11:
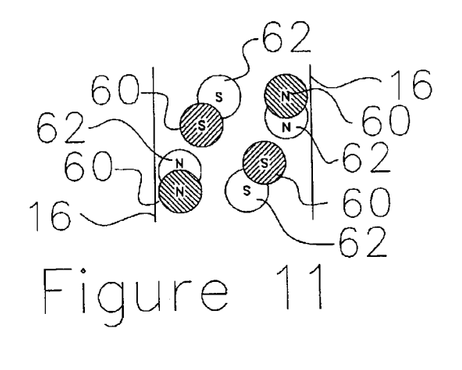
FIG. 11 illustrates an eight-pole embodiment of the invention where non-interacting poles are placed with symmetry across a central axis perpendicular to the plane of the illustration.
Figure 12:
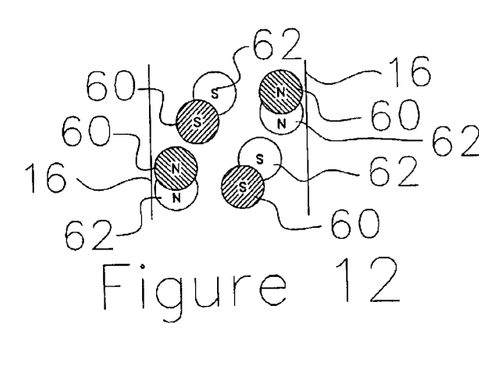
FIG. 12 illustrates an eight-pole embodiment of the invention where non-interacting poles are placed with symmetry about the geometric center point of the degaussing volume.

The improved configurations of the invention, shown in FIGS. 11 and 12, share identical pole X-Y coordinate values. Each improved configuration includes two sets of four poles in arrangement similar to that shown in FIG. 10. FIG. 11 illustrates an improved configuration with like pole positions reflected through the axis to the same-side, yielding additional near-to-far field regions spanning outer portions of the degaussing pathway at a large angle relative to the fields shown in FIG. 10. FIG. 12 illustrates an improved configuration with like pole positions reflected through the origin to the opposite-side, yielding an additional angled near field on the left, and an additional angled far field on the right.

Like all degaussers, the resulting fields of the improved configurations are imperfectly uniform. Application of pole placement symmetry places less near-side pole toward the center of FIG. 11 and less near-side pole on the right of FIG. 12. Nevertheless, such configurations yield merits similar to an extruded "C" magnet array configuration with a fraction of the material. Although specific weaknesses differ, the improved configurations also yield merit about equal to each other, which illustrates how the invention can be realized in a variety of embodiments. Simply placing the embodiments shown in FIGS. 11 and 12 in series, such that media must pass through both field configurations, yields erasure performance equivalent to that achievable by the arrangement represented by FIG. 1 at about half the material weight and cost.

FIGS. 11 and 12 illustrate 3-inch diameter poles placed about an 11-inch wide window to accept the large D1 case form factor and treat the central 9.5 inches of that form with greatest effect. Specific placement for other form factors varies by width and thickness, as well as by pole shape and size, such as by diameter in the case of circular poles. Balance between Z-directed and horizontal strength can be achieved through the degree of overlapping pole placement. For a permanent magnet embodiment, magnet length determines the strength of the invention. Since magnets can be stacked easily to vary length and strength, a single permanent magnet size can find use in a variety of degausser models, as opposed to the different magnet sizes used for different models in prior art, which eases inventory and production requirements.

Figure 13:
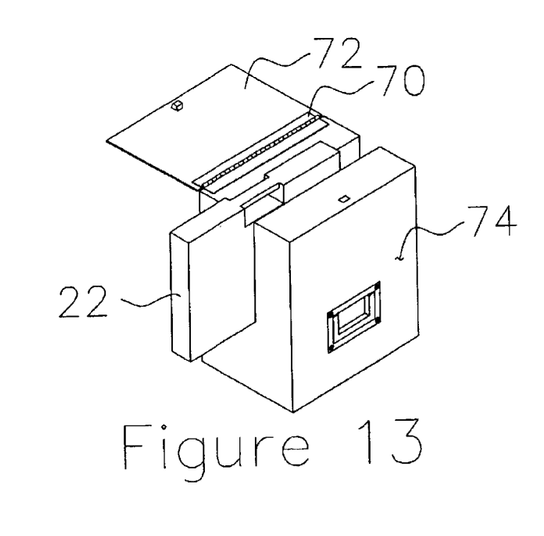
FIG. 13 illustrates containment of the invention without restriction of media width, suiting it to protective cases that may vary in that dimension.

The media pathway need not be enclosed on four sides nor be strictly linear. As shown in FIG. 13, an embodiment with two guides constraining rectangular form factors like small cassette media to a 9-inch wide pathway can provide hinge means 70 for temporary displacement of one media guide 72 defining that restriction. In particular, the handle of the large D1 case 22 defines a region devoid of tape and provides an implement to aid media passage through an open-sided degausser 74. The smaller degaussing window enables closer pole placement for higher strength and more variable direction.

Figure 14:
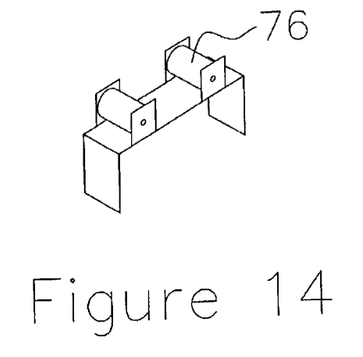
FIG. 14 illustrates roller means, which may be provided either as an adapter as shown, or incorporated into the container means of FIG. 13, in order to guide exposure of tape on circular reels having diameters upwards of twice the size of the effective degaussing volume.

Unlike the cassette itself, which must conform strictly to dimensional standards required for media interchange, protective case dimensions may change. The open-sided configuration admits protective cases taller than an 11-inch width. Exceptionally large media such as reels commonly used in diameters to 16 inches can also be set into the open-sided degaussing region. Such reels can be rotated by hand for one full turn against accessory guide rollers 76, illustrated in FIG. 14, fitting onto the fixed linear guide, in effect providing motion of all tape similar to that seen by linear motion of cassettes through the fields, even though the reel rotates about its axis.

While the detailed examples best suit emergency applications, where noise resulting from application of DC fields may be seen as beneficial to the purpose of safeguarding information, modifications to invention can be provided to prevent such DC noise or other "signature" effects from interfering with media re-use. For example, an electrically powered AC degaussing magnet may be added to the media pathway. Then, the invention can be used with power to erase tape and prepare it for re-use, or without power in an emergency to erase both tapes and disks.

Obviously, many modifications and variations of the present invention are possible in light of the above teachings. Thus, it is to be understood that, within the scope of the appended claims, the invention may be practiced otherwise than as specifically described above.

What is claimed is:

1. A bulk degaussing apparatus for erasing various sizes of magnetic media, comprising:
   a plurality of fixed magnetic poles predisposed along and across different sides of a gap, providing means to project magnetic flux across said gap, and
   such poles being spaced at intervals or sets of similar intervals across and along the gap, forming sets of fixed fields at intervals and directions across and along the width of media passage, such that every point in the media passing linearly through the gap passes through the fields resulting from adjacent sets of poles over the course of passage, or different fields from different sets of adjacent poles, or both, and
   said fields being multi-directional, and
   a guide adapter for constraining the location of media passing into or through the gap by the plurality of poles to the effective degaussing regions formed between the poles.

2. The apparatus as recited in claim 1, further comprising supplementary fixed poles of substantially different configuration than the plurality of poles and intended to produce any magnetic field direction not produced by the primary plurality of magnetic poles and associated magnetic fields.

3. The apparatus as recited in claim 1 or claim 2, further comprising adjustment means adapting the gap between the poles to different media thickness.

4. The apparatus as recited in claim 1 or claim 2, further comprising an accessory for supplementary restriction of different media form factors to more effective regions of the degaussing fields.

5. An apparatus as recited in claim 4, wherein said accessory introduces media with magnetically attractive components into the field and extracts such media from the field.

6. A bulk degaussing apparatus for erasing various sizes of magnetic media, comprising:
   a plurality of fixed magnetic poles formed by assembly of electromagnet or permanent magnet and iron elements predisposed along and across different sides of a gap, providing means to project magnetic flux across said gap, and
   a spacer for spacing of such poles at roughly equal intervals or sets of similar intervals across the gap, forming a set of fields at staggered intervals across the width of media passage and providing multi-directional fields, such that every point in media passing linearly through the gap passes through either a field resulting from adjacent poles that changes direction over the course of passage, or different fields from different sets of adjacent poles that differ in direction, or both, and
   a guide means for constraining the location of media passing the gap formed by the plurality of poles to the effective degaussing regions formed between the poles.

7. A bulk degaussing method for erasing various sizes of magnetic media, comprising:
   providing a plurality of fixed magnetic poles formed by assembly of electromagnet or permanent magnet and iron elements predisposed along and across different sides of a gap, providing means to project multi-directional magnetic flux across said gap, and
   placing of said poles so that facing poles on opposite sides of the pathway established for media passage are offset and only partially overlap.

8. The method as recited in claim 7, comprising a serial arrangement of at least two multi-poled degaussing regions, differing in their orientation so as to avoid regional weaknesses of singular arrangements.

9. The method as recited in claim 7, comprising a serial arrangement of two or more multi-poled degaussing regions, differing in their arrangement, so as to avoid regional weaknesses of singular arrangements.

10. The method as recited in claim 7, wherein said magnetic poles are provided having an aspect ratio of approximately unity.

11. A bulk degaussing apparatus for erasing magnetic media, comprising:

a plurality of fixed magnetic poles predisposed along and across different sides of a gap for projecting multi-directional magnetic flux across said gap, spacing of said poles at intervals across the gap, forming a set of fields at staggered intervals;

a media passage, such that every point in media passing across the width of said media passage is exposed to the set of fields linearly through which the gap passes; and an adapter to constrain location of media passing through the gap formed by the plurality of poles to the effective degaussing regions formed between the poles.

12. The apparatus as recited in claim 11, further comprising supplementary fixed poles of substantially different configuration than the plurality of poles and intended to produce any magnetic field direction not produced by the primary plurality of magnetic poles and associated magnetic fields.

13. The apparatus as recited in claim 11, further comprising an accessory for supplementary restriction of different media form factors to more effective regions of the degaussing fields for introducing media with magnetically attractive components into the field or extracting such media from the field.

14. A bulk degaussing method for erasing various sizes of magnetic media, comprising:

projecting multi-directional magnetic flux across a gap with a plurality of fixed magnetic poles formed by an assembly of magnets and iron elements predisposed along and across different sides of a gap;

spacing of the poles at roughly equal intervals or sets of similar intervals across the gap;

forming a set of fields at staggered intervals across the width of media passage, such that every point in media passing linearly through the gap passes through either a field resulting from adjacent poles that changes direction over the course of passage, or different fields from different sets of adjacent poles that differ in direction, or both; and constraining the location of media passing through the gap formed by the plurality of poles to the effective degaussing regions formed between the poles.

* * * * *